June 22, 1965
H. AUSSERBAUER
3,190,144
CRANKSHAFT FOR INTERNAL COMBUSTION ENGINES
Filed Feb. 28, 1962
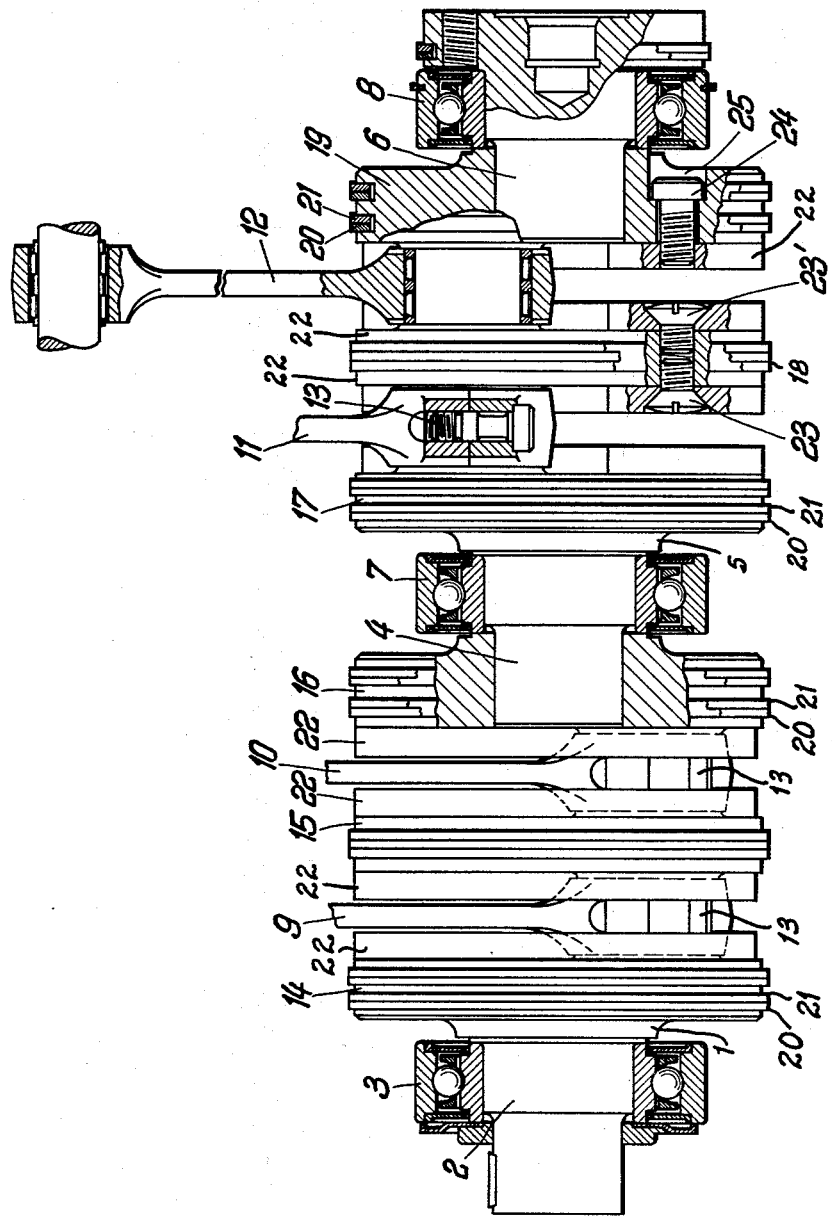
Inventor:
Helmut Ausserbauer
BY
Richards & Geier
ATTORNEYS

3,190,144
CRANKSHAFT FOR INTERNAL COMBUSTION ENGINES
Helmut Ausserbauer, Pettenkoferstrasse 11, Ingolstadt, Bavaria, Germany
Filed Feb. 28, 1962, Ser. No. 176,352
Claims priority, application Germany, Mar. 21, 1961, A 37,012
1 Claim. (Cl. 74—597)

This invention relates to a crankshaft for internal combustion engines and refers more particularly to a triple-bearing crankshaft for four cylinder-V or boxer-two-stroke internal combustion engines with crankcase pump, intended particularly for motor vehicles.

Prior experience has shown that ball bearings are quite effective as bearings for compressed crankshafts, such as the crankshafts of two-stroke internal combustion engines with three cylinder row formation. They develop little noise and are well suited to absorb bending stresses of such crankshafts. Due to this capacity of absorbing bending vibrations without being damaged, they are particularly useful for crankshafts the bearings of which are spaced at comparatively great distances.

An object of the present invention is to further improve prior art constructions of this type.

Another object of this invention is the provision of a simply constructed sturdy crankshaft providing good balancing of masses and having small cylinder clearance for the crankcase pump.

Other objects of the present invention will become apparent in the course of the following specification.

The present invention is concerned with a triple-bearing crankshaft for four cylinder-V or boxer-two-stroke internal combustion engines with crankcase pump.

In accomplishing the objects of the present invention it was found desirable to make the crankshaft of two parts which are the same in the raw cast state, each part receiving two connecting rods divided at the large eye; the crankshaft also has a pivot for the flywheel. Since the two crankshaft parts are made of the same raw castings, their manufacture is very simple. Furthermore, the entire crankshaft has only three pressed connections, so that fitting inaccuracies are limited to a very narrow range and so that a precise running of all three ball bearings and of the four divided connecting rod bearings is assured. The three ball bearings are of the usual commercially available type and in case of repairs can be easily exchanged by pressing the individual parts of the crankshaft away from each other. Thus, for example, it is not necessary to subject the track of the anti-friction bearings to subsequent polishing. A particularly effective seal and simultaneous diminution of the cylinder clearance of the crankcase pump are attained by the sealing of each crank disc by split rings which are known per se, in addition to the two-sided seals in the crankshaft ball bearings. Due to this double sealing any danger of damage to the ball bearings is eliminated for all practical purposes, since rubbed off metal particles, oily carbon particles and other damage-inflicting particles from the crank case cannot get to the ball bearings.

According to a further feature of the present invention counter-weights are screwed upon the flat surfaces of the crank discs directed toward the connecting rods. This arrangement diminishes to a considerable extent the cylinder clearance of the crankcase pump and also improves the equilibrium of masses to such a great extent that, for example, in the case of a four cylinder-V motor the large counterweight masses completely balance the force moments of the first order.

Furthermore, according to another feature of the present invention, the screws for the counter-weights of one crankshaft part are in alinement with each other, and the screws for the counterweights of the inner crank disc can be loosened or tightened through openings provided for the counterweight holding screws of the outer crank discs.

The invention will appear more clearly from the following detailed description when taken in connection with the accompanying drawing, showing by way of example, a preferred embodiment of the inventive idea.

The sole figure of the drawing is partly a side view of, and partly a longitudinal section through a crankshaft of a four-cylinder motor.

The illustrated crankshaft comprises a front crankshaft part 1 which is carried in a ball bearing 3 along with a pivot 2. The rear end of the crankshaft part 1 has an inner bore engaged by a pivot 4 of a crankshaft part 5. Thus the crankshaft consists of two parts 1 and 5.

The crankshaft parts 1 and 5 are made of the same raw castings.

The crankshaft part 5 has an inner bore at its rear end into which is pressed a pivot 6 for the flywheel (not shown).

The crankshaft has three main bearings 3, 7 and 8 which are all undivided ball bearings sealed on both sides, namely, the crankshaft part 1 has the bearing 3, the crankshaft part 5 has the bearing 7 and the pivot 6 has the bearing 8.

The crankshaft parts 1 and 5 carry connecting rods 9, 10, 11 and 12 having divided annular bases enclosing divided anti-friction bearings which are held together by screws 13 in the usual manner. The crankshaft part 1 carries the connecting rods 9 and 10, while the crankshaft part 5 carries the connecting rods 11 and 12.

The crankshaft part 1 has crank discs 14, 15 and 16, while the crankshaft part 5 has crank discs 17, 18 and 19. The circumferential surfaces of these crank discs are provided with grooves receiving split rings 20, 21. The split rings constitute a labyrinth packing. Due to their resiliency they firmly engage the crankshaft casing (not shown) and do not rotate along with the crankshaft. Gas flows through the narrow spaces between the split rings and their grooves and its flow is thus braked. This braking action is furthered by the oil carried by the gas.

The flat surfaces of the crank discs 14, 15, 16, 17, 18 and 19, which are directed toward their adjacent connecting rods 9, 10, 11 or 12, carry counterweights 22 which are firmly attached to the discs by screws 23, 23'.

In order to attach the counterweights, a tool can be inserted, for example, through the opening 25 of the crank dics 19, or a similar opening in the crank disc 17, so as to tighten the screws 23 and 23' of the inner disc 18. The counter-weights 22 for the outer crank discs 19 and 17 are screwed on thereafter by screws 24 inserted through the openings 25. The counter-weights 22 for the discs 14, 15 and 16 of the crankshaft part 1 are attached in the same manner. The crankshaft parts 1 and 5 and the pivot 6 for the flywheel are pressed together only after the counterweights have been firmly screwed on.

The illustrated crankshaft operates in the usual manner.

It is apparent that the illustrated and described crankshaft is of simple and sturdy construction which provides a most effective equilibrium of masses and has small cylinder clearance for the crankcase pump.

It is further apparent that many variations and modifications may be made in the illustrated example within the scope of the present invention. All such variations and modifications are to be included within the scope of the present invention.

What is claimed is:

A crankshaft for four cylinder-V or boxer two stroke internal combustion engine with crankcase pump, comprising in combination with a flywheel pivot; two similar crankshaft parts, each of said crankshaft parts having a pivot at one end, a bore at the other end and three crank discs between the two ends, the pivot of one of said crankshaft parts extending into the bore of the other one of said crankshaft parts, said flywheel pivot extending into the bore of said one crankshaft part, separate bearings enclosing the pivots of the crankshaft parts, a third bearing enclosing said flywheel pivot, two connecting rods carried by said one crankshaft part, two connecting rods carried by the other crankshaft part, counterweights upon those surfaces of the crank discs which face the connecting rods, and screws connecting the counterweights to those surfaces of the crank discs which face the connecting rods, the screws pertaining to each crankshaft part being in alinement with each other, the outwardly located crank discs having screw-receiving openings providing access to screws carried by inwardly located crank discs, at least some of said screws having heads located adjacent said bearings.

References Cited by the Examiner
UNITED STATES PATENTS

| | | | |
|---|---|---|---|
| 1,035,460 | 8/12 | Minnich | 74—597 |
| 1,613,835 | 1/27 | Kasper | 74—597 |
| 1,908,071 | 5/33 | Snyder | 74—598 |
| 2,741,932 | 4/56 | Whitney et al. | 74—597 |
| 2,926,939 | 3/60 | Workman | 308—187.2 |

FOREIGN PATENTS

| | | |
|---|---|---|
| 117,535 | 9/43 | Australia. |
| 353,576 | 5/61 | Switzerland. |

BROUGHTON G. DURHAM, *Primary Examiner.*

DON A. WAITE, *Examiner.*